United States Patent Office 3,494,112
Patented Feb. 10, 1970

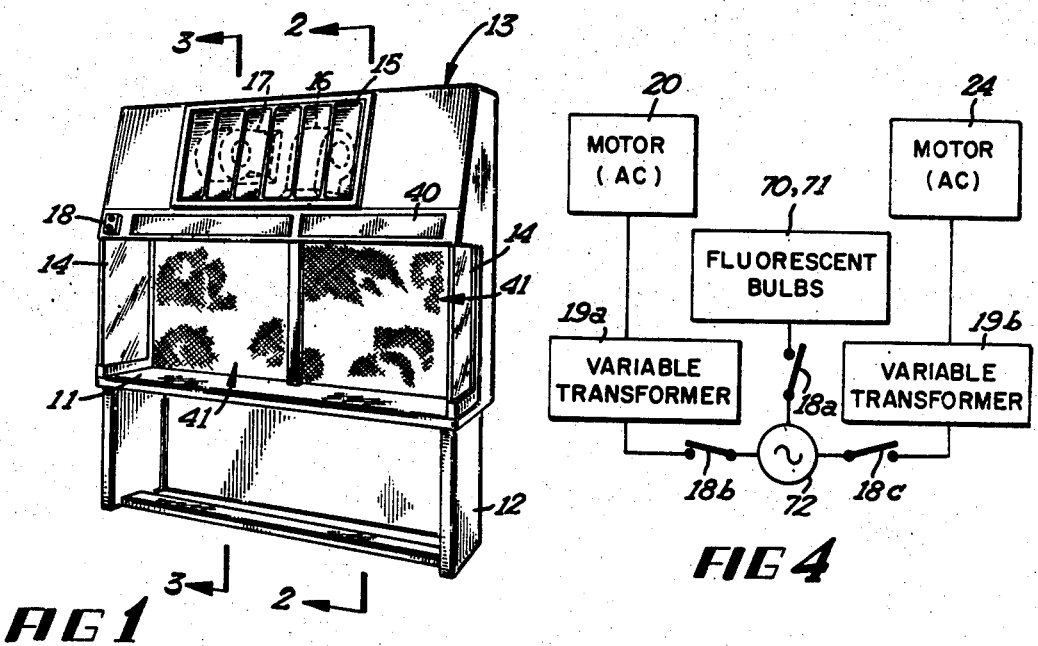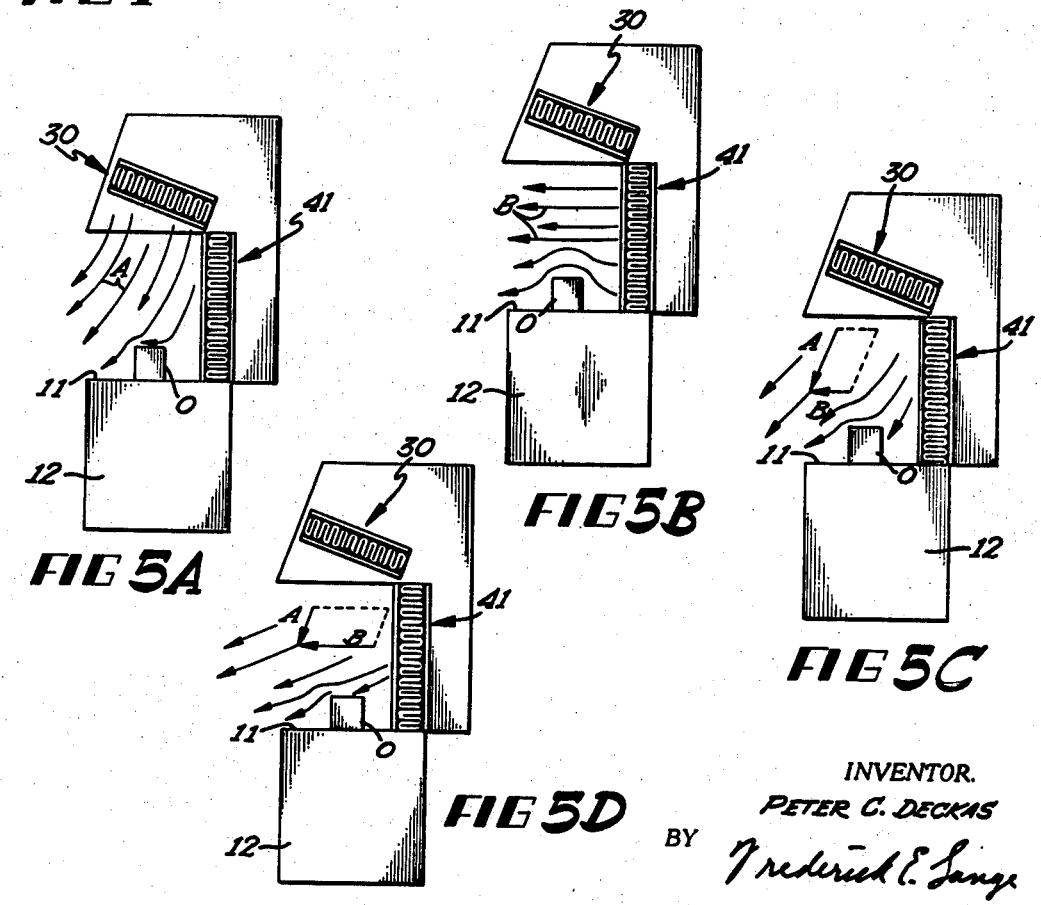

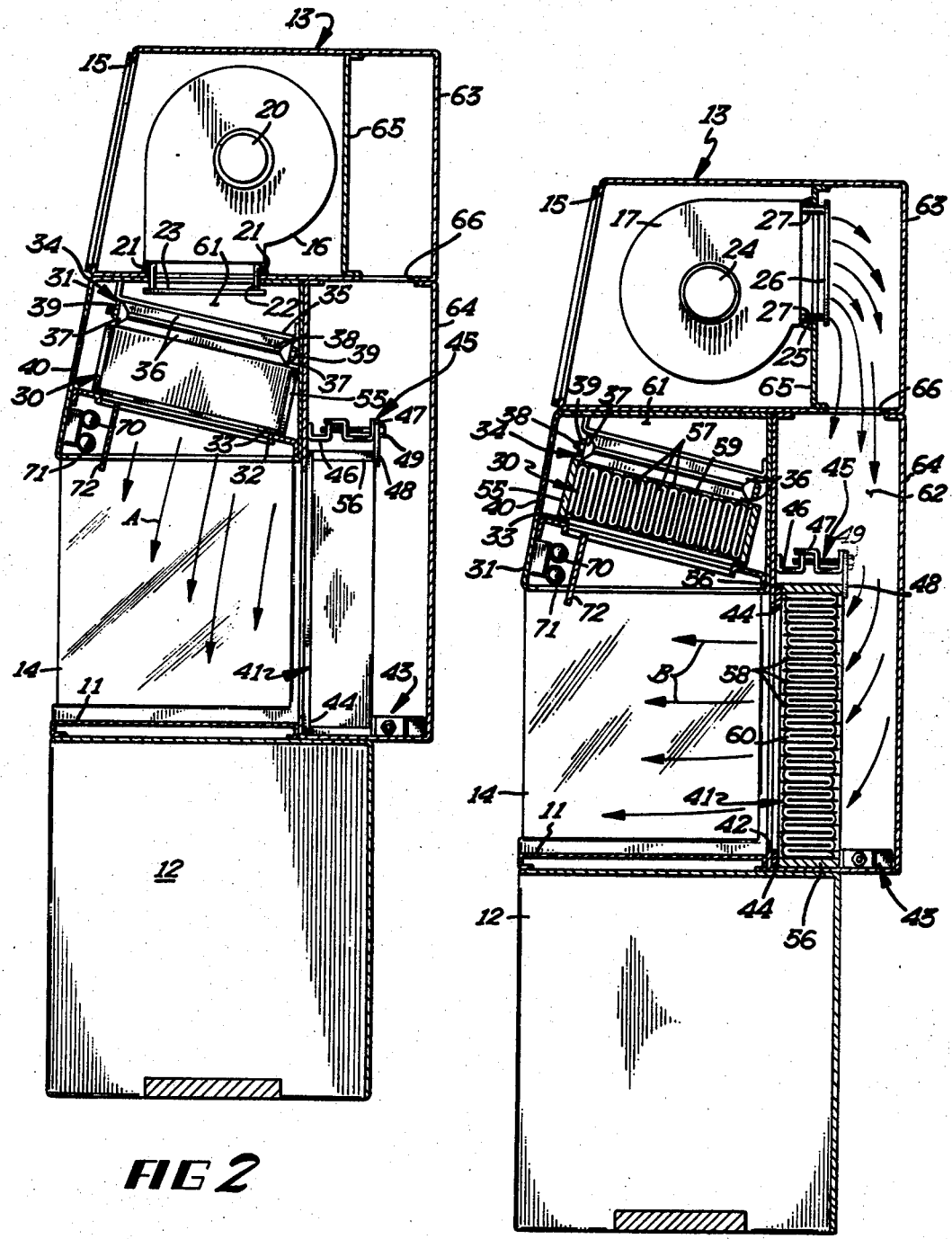

3,494,112
CLEAN AIR WORK STATION
Peter C. Deckas, Minneapolis, Minn., assignor to Dexon, Inc., Minneapolis, Minn., a corporation of Minnesota
Continuation of application Ser. No. 598,478, Dec. 1, 1966. This application Apr. 16, 1969, Ser. No. 824,722
Int. Cl. F23j *11/00;* B01d *50/00*
U.S. Cl. 55—470                                6 Claims

ABSTRACT OF THE DISCLOSURE

A laminar-flow, clean air work station characterized by two converging clean airstream components directed toward the station work surface, and means for adjusting the components to thereby adjust the direction and magnitude of the resultant airstream to insure laminar flow around an object on the work surface.

---

This application is a continuation of Ser. No. 598,478 now abandoned.

BACKGROUND OF THE INVENTION

Ultra-clean, dust-free work areas have become highly desirable, if not necessary, in many fields such as electronics, medicine and pharmacy, biological research, and atomic research. Clean air work areas have been provided in the form of entire rooms and, on a smaller scale, in the form of work stations or hooded work tables. The work stations or tables have generally been characterized by a single filtered laminar airstream flowing over a hooded work surface and out of the hooded area to provide an air curtain between the work surface and the outside air. While such work stations provide an effective air curtain when small regularly shaped objects are placed on the work surface, the air curtain is not effective when larger bulky, irregularly-shaped objects are placed on the work surface. The larger objects tend to disrupt the laminar air flow across the work surface and cause eddy currents and turbulence. The turbulence breaks up the protective air curtain and contamination of the work area by unfiltered ambient air results.

SUMMARY OF THE INVENTION

The present invention eliminates the eddy currents and turbulence associated with large, irregularly-shaped objects in the work area. It provides for laminar flow around the object on the work surface and an effective air curtain is maintained. The invention, accordingly, has the following objects:

To provide a clean air work station which maintains laminar clean air flow about irregularly-shaped objects disposed thereon;

To provide a laminar-flow, clean air work station characterized by two intersecting airstream components directed toward the work station surface and means for adjusting the components to thereby adjust the resultant airstream;

To provide a clean air work station having a substantially vertically directed airstream component and a substantially horizontally directed airstream component, both directed toward said work surface, and means for independently varying the velocity of each of the airstream components;

To provide a clean air work station having blower means for providing a vertically directed airstream component and distinct blower means for providing a horizontally directed airstream component, both directed toward the work surface, and means for independently varying the output of the blowers.

In general, the invention comprises a horizontally disposed work surface, means for filtering ambient air, means for directing the filtered air over the work surface in a first stream transversely toward the work surface and in a second stream substantially parallel with and across the work surface, and means for varying the relative effect of the first and second airstreams. In the preferred embodiment, the means for directing the filtered air over the work surface in the first and second streams comprises a first blower and a second blower and directional filter means associated respectively with said first and second blowers for providing the first and second airstream respectively. Adjustment of the horizontal and vertical airstream components is made in the preferred embodiment by varying or adjusting the output of the first and second blowers individually.

DESCRIPTION OF THE DRAWINGS

Each of the above objects is fulfilled in the specific embodiment of the invention shown in the drawings wherein:

FIGURE 1 is a perspective view of the clean air work station which comprises the present invention;

FIGURE 2 is a vertical sectional view taken on the line 2—2 of FIGURE 1 and shows the blower, blower motor, directional filter and plenum for providing the first airstream directed transversely toward the work surface;

FIGURE 3 is a vertical sectional view, similar to the view of FIGURE 2, taken on the line 3—3 of FIGURE 1 and shows the blower, blower motor, directional filter, and plenum for providing the second airstream directed substantially horizontally across the work surface;

FIGURE 4 is a block diagram showing the electrical system for individually controlling the blower output (motor speed) and lighting;

FIGURES 5A, 5B, 5C, and 5D are diagrammatic, vertical sectional views which depict the principle of operation of the present invention. FIGURE 5A shows the first or vertically directed airstream or component. FIGURE 5B shows the second or horizontally directed airstream or component. FIGURE 5C shows the resultant laminar air flow around an object with the first and second airstreams adjusted to provide a major vertical component. FIGURE 5D shows the resultant laminar air flow about an object with the first and second airstreams adjusted to provide a major horizontal component.

DESCRIPTION OF THE PREFERRED EMBODIMENT

The invention is shown generally in FIGURE 1. It includes a horizontally disposed work surface 11, a base 12, an upper hood section 13, side curtains 14, and an ambient air intake 15. Two blowers 16 and 17 are housed in hood 13 in close proximity to ambient air intake 15. The output of blower 16 provide the generally vertically directed or first airstream component for the work station. The output of blower 17 provides the substantially horizontally directed or second airstream component for the work station. A switch box 18 includes means for turning the blowers 16 and 17 and flourescent lights (described below) on and off. Means are provided for independently varying the speed of the motors which drive blowers 16 and 17 to thereby independently adjust the velocity of the first and second airstreams.

The invention is shown more specifically in FIGURES 2 and 3. FIGURE 2 shows the means for directing filtered air over the work surface in the first stream in a substantially vertical direction transversely toward the work surface. FIGURE 3 shows the corresponding means for directing filtered air over the work surface in the second stream substantially parallel with and across the work surface.

With reference to FIGURE 2, blower 16 is driven by motor 20. Motor 20 is an alternating current, split capacitance, one-quarter horsepower, 1075 r.p.m. electric motor. Blower 16 is mounted in hood 13 and discharges downwardly. A rubber skirt 21 extends from the blower mouth to the blower cavity 22 in hood 13. Blower 16 also includes a diffuser 23 which consists of a perforated screen.

Blower 17, shown in FIGURE 3, is driven by motor 24 which is identical to motor 20. Like blower 16, blower 17 has a rubber skirt 25 and a diffuser 26 and discharges through hood cavity 27.

Blowers 16 and 17 have a 20–140 cubic feet per minute per square foot of filter face area output range and are both statically and dynamically balanced. Blowers 16 and 17 are of the squirrel cage type.

With reference to FIGURE 2, a first airstream filter 30 is mounted downstream from blower 16 and upstream from work surface 11, above work surface 11 in lower hood section 31. First airstream filter 30, described more particularly below, is mounted with its discharge face over first airstream aperture 32 in sealed relationship therewith due to the provision of gasket 33. First airstream filter 30 is compressed against gasket 33 by means of wedge 34, one of which is provided at each edge of first airstream filter 30.

Wedge 34 compresses against wedge bracket 35, on one side, and first airstream filter 30, on the other side. Wedge 34 consists of two trapezoidally shaped elongate members 36, trapezoidally shaped transverse members 37, longitudinally threaded member 38, and a pair of nuts 39. As one of the nuts 39 is turned on threaded rod 38, transverse members 37 are drawn together to spread elongate members 36 apart and cause compression against bracket 35 and first airstream filter 30. First airstream filter 30 is accordingly held in sealed relationship with first airstream filter aperture 32 with the compression of gasket 33.

A pair of first airstream filters 30 is provided in a typical embodiment, although but one filter is apparent in the drawings. Both filters are served by blower 16 and are placed side by side in lower hood section 31 which includes a filter access door 40 which, when opened, provides access to the pair of first airstream filters 30.

Second airstream filters 41 are similar to first airstream filters 30 and are mounted in sealed to first airstream filter 30 and are mounted in sealed relationship with second airstream aperture 42 by means of wedge 43, gasket 44, and clamping assembly 45.

The lower edge of second airstream filter 41 is held in sealed relationship with second airstream aperture 42 by means of wedge 43, identical to wedge 34 previously described. The upper edge of filter 41 is held in place by means of clamping assembly 45 shown in FIGURES 2 and 3 which differs from wedges 34 and 43. Clamping assembly 45, shown in FIGURES 2 and 3, includes a fixed clamping bracket 46, a filter clamp 47, a plate 48 secured to clamp 47, and a clamping bolt 49. A number of clamping assemblies 45 are provided along the length of the work station to uniformly compress the top edge of second airstream filter 41 against gasket 44 and second airstream aperture 42.

As is the case with first airstream filters 30 a pair of second airstream filters 41 is provided, as shown in FIGURE 1. Both of the second airstream filters 41 are served by blower 17.

Filters 30 and 41 are directional filters and consist of plywood outer frames 55 and 56, respectively, a plurality of directional dividers 57 and 58, respectively, and a filter medium 59 and 60, respectively, which is accordian folded between directional dividers 57 and 58. Thus filters 30 and 41 provide a large effective medium area compared to their face area. More particularly filters 30 and 41 provide approximately fifty square feet of effective medium per square foot of face area. Filter medium 59 and 60 is preferably of a glass-asbestos composition with a 99.97 percent efficiency when tested wih 0.3 micron dioctylphthalate smoke. Filters 30 and 41 should prefer- ably have a static pressure drop of less than one inch water (guage pressure) when operating at a throughput of 100 feet per minute.

Dividers 57, in the case of first airstream filter 30, are disposed in spaced parallel planes transverse to work surface 11 and substantially perpendicular to side curtains 14 and consist of corrugated aluminum sheeting. Thus first airstream filters 30 provide a directional output transversely toward work surface 11.

Dividers 58, in the case of second airstream filters 41, are disposed in spaced parallel relationship with work surface 11 and accordingly direct the output substantially parallel to and across work surface 11.

While various filters may be satisfactorily used in the present invention, a preferred filter, desscribed above, is available from Cambridge Filter Corporation of Syracuse, N.Y., under the trademark Absolute.

With reference to FIGURE 2, the output of blower 16 communicates with first airstream filter 30 through plenum 61. The output of blower 17, shown in FIGURE 3, communicates with second airstream filter 41 through plenum 62. Plenum 61 is defined by lower hood section 31. Plenum 62 is defined by upper hood section 13, and vertically disposed sheeting 63, 64, and 65. An opening 66 is provided in sheeting 67 at the juncture of upper hood section 13 and lower hood section 31.

Thus blower 16 generates the first airstream, shown at arrows A, which enters upper hood section 13 through intake 15 (as ambient air), passes through blower 16, diffuser 23, first airstream filter 30, and (as filtered air), transversely toward work surface 11.

The second airstream, shown at arrows B, enters upper hood section 13 through intake 15 (as ambient air) and is discharged from the blower 17 through diffuser 26, downwardly through plenum 62, through second airstream filter 41 and (as filtered air) substantially parallel with and across work surface 11.

As best seen in FIGURES 2 and 3, lighting is provided with two fluorescent bulbs 70 and 71 mounted in lower hood section 31. A glass shield 72 extends the length of bulbs 70 and 71.

The wiring of the blower motors is shown diagrammatically in FIGURE 4. The fluorescent lights 70 and 71 are also controlled by an individual switch 18a. Individual switches 18b and 18c and variable transformers 19a and 19b are provided for each motor 20 and 24. Accordingly motor speed can be controlled independently from a single source of alternating current 72. Variable transformers 19a and 19b consist of the type commonly referred to as a Variac.

The operation of the present invention may be conveniently understood with reference to FIGURES 5A, 5B, 5C, and 5D. The object, O, placed on work surface 11 is subjected to a first airstream component, arrows A, in FIGURE 5A, and a second airstream component, arrows B, in FIGURE 5B. In operation the first and second airstreams pass toward and over object, O, and work surface 11 simultaneously. The magnitude and direction of the resultant of the first and second airstreams may be adjusted and controlled by varying the relative speed of the two blower motors 20 and 24. A major first airstream component, shown in FIGURE 5C, or a major second airstream component, shown in FIGURE 5D may be provided as desired. Thus the resultant airstream may be adjusted or "tuned" to eliminate eddy currents and turbulence around object, O, on work surface 11.

Tuning may be best accomplished through the use of a small container of Dry Ice (solidified $CO_2$) placed on the leeward side of object, O. As sublimation occurs, the carbon dioxide vapor, highly visible, is blown out of the clean air work station by the first and second airstreams. If eddy currents and turbulence exist on the leeward side of object, O, the turbulence is reflected in the path taken by the carbon dioxide vapor. Accordingly, the work station may be "tuned" to eliminate the turbulence by adjusting the relative output of blowers 16 and 17, until the carbon dioxide vapor assumes a laminar flow path. When a laminar flow path of the vapor is achieved the work station is tuned to provide an effective air curtain separating object, O, and work surface 11 from the outside, unfiltered, ambient air.

For the purpose of the above adjustment, the output of blowers 16 and 17 should be variable in a range sufficient to vary the velocity of the first and second airstreams within the range of 20 to 140 f.p.m. Thus the blower output range must be a function of the filter face area and, as indicated previously, should be 20 to 140 cubic feet per minute per square foot of filter face.

As different objects, O, with different shapes are placed on work surface 11, the first and second airstreams may be readjusted as described above to provide laminar air flow around the object.

Variations may be made in the illustrated embodiment without departing from the scope of the invention. A single blower might be used to provide both the first and second airstreams. With the provision of but one blower, airstream adjustment could be made through the use of a gate or damper to selectively conduct varying portions of the blower output to the first and second airstream filters. If two blowers are provided, various means may be used to adjust blower output, and adjustment by Variac control of A.C. motor speed is not critical. Also an airstream directional means without a filter medium could be provided in the position assumed by first airstream filters 30 and second airstream filters 41, with the filtering occurring further upstream through the provision of one filter medium. Adjustment or tuning of the work station could be accomplished by varying the direction, as opposed to the velocity, of the airstream components, as an additional variation from the illustrated embodiment.

What is claimed is:

1. A laminar flow clean air work station comprising:

a cabinet having a horizontal panel disposed above the floor and forming a horizontally disposed work surface, said cabinet having portions forming with said horizontal panel a compartment above said horizontal work surface, said compartment having side walls, an open top, an open back, and an open front, means securing across the top of said compartment a first laminar filter construction extending generally horizontally and having spaced directional dividers therein extending generally vertically to direct in a generally vertical direction any air flowing therethrough, means securing across the back of said compartment a second laminar filter construction extending generally vertically and having spaced directional dividers therein extending generally horizontally to direct in a generally horizontal direction any air flowing therethrough, said cabinet having means forming plenum chambers adjacent the upstream sides of said first and second filter constructions, said cabinet having wall members defining first and second passageways, each of which have an inlet communicating with a source of air, a first of said passageways having an outlet terminating with the plenum chamber at the top of said compartment and across which said first laminar filter construction extends, a second of said passageways having an outlet terminating with the plenum chamber at the back of said compartment and across which said second laminar filter construction extends, a separate blower connected to each of said passageways for forcing air through said two passageways and out through the laminar filter constructions so that air passing through said first passageway passes downwardly toward said work surface and so that air passing through said second passageway passes generally horizontally across said work surface to form a resultant airstream moving over said work surface, the direction of which is dependent upon the relative volumes of air flowing through said two passageways, and means associated with each of said blowers for varying in relatively small steps the relative volumes of air flowing through said two passageways to vary the direction of said resultant airstream.

2. The work station of claim 1 in which each said blower is operatively connected to a separate variable speed motor for driving said blower and in which said means for varying the relative volumes of air flowing through said two passageways consists of means for varying in relatively small steps the speeds of said motors.

3. The work station of claim 2 in which said motors are alternating current motors and in which the means for varying the speed of said motors consists of a variable transformer.

4. The work station of claim 1 in which each of said laminar filter constructions consists of an accordion filter member.

5. The work station of claim 1 in which the cabinet comprises lower support members for supporting said horizontal panel on the floor a substantial distance above the floor.

6. A laminar flow clean-air work station comprising:

a cabinet having a horizontal panel disposed above the floor and forming a horizontally disposed work surface, said cabinet having portions forming with said horizontal panel a compartment above said horizontal work surface, said compartment having side walls, an open top, an open back, and an open front, means securing across the top of said compartment a first laminar filter construction extending generally horizonally and having spaced directional dividers therein extending generally vertically to direct in a generally vertical direction any air flowing therethrough, means securing across the back of said compartment a second laminar filter construction extending generally vertically and having spaced directional dividers therein extending generally horizontally to direct in a generally horizontal direction any air flowing therethrough, said cabinet having means forming plenum chambers adjacent the upstream sides of said first and second filter constructions, said cabinet having wall members defining first and second passageways, each of which have an inlet communicating with a source of air, a first of said passageways having an outlet terminating with the plenum chamber at the top of said compartment and across which said first laminar filter construction extends, a second of said passageways having an outlet terminating, with the plenum chamber, at the back of said compartment and across which said second laminar filter construction extends, blower means connected to each of said passageways for forcing air through said two passageways and out through the laminar filter constructions so that air passing through said first passageway passes downwardly toward said work surface and so that air passing through said second passageway passes generally horizontally across said work surface to form a resultant airstream moving over said work surface, the direction of which is dependent upon the relative volumes of air flowing through said two passageways, and means associated with said blower means for varying in relatively small steps the relative volumes of air flowing through said two passageways to vary the direction of said resultant airstream.

References Cited

UNITED STATES PATENTS

| | | |
|---|---|---|
| 1,778,046 | 10/1930 | Strobell. |
| 2,833,122 | 5/1958 | Kohl et al. |
| 2,855,762 | 10/1958 | Zehnder. |
| 3,151,929 | 10/1964 | Potapenko. |
| 3,212,424 | 10/1965 | Davis. |
| 3,251,177 | 5/1966 | Baker. |
| 3,284,148 | 11/1966 | Ramniceance. |
| 3,290,866 | 12/1966 | Schronrock. |
| 3,318,076 | 5/1967 | Baker. |

FOREIGN PATENTS

| | | |
|---|---|---|
| 909,924 | 11/1962 | Great Britain. |

HARRY B. THORNTON, Primary Examiner

B. NOZICK, Assistant Examiner

U.S. Cl. X.R.

55—473, 484, 481, 497, 502, 521; 98—115; 230—12